July 25, 1939.  J. J. RIEHL  2,167,186

AUTOMOBILE BUMPER GUARD

Filed Sept. 7, 1938

INVENTOR.
John J. Riehl.
BY Morton S. Brockman
ATTORNEY.

Patented July 25, 1939

2,167,186

UNITED STATES PATENT OFFICE 2,167,186

AUTOMOBILE BUMPER GUARD

John J. Riehl, Cleveland, Ohio

Application September 7, 1938, Serial No. 228,774

4 Claims. (Cl. 293—55)

This invention relates to vehicle fenders and particularly to the type of guard mounted on automobile bumpers for the further protection of the automobile body.

The principal object of the invention is to provide a device which, when attached to an automobile will not readily entangle with similar projections on other vehicles; and which, if caught by such other projections can be quickly and easily disengaged therefrom.

Another object is to provide a device of the character mentioned which does not obstruct the opening of the rear trunk compartment and also which does not obstruct the engine crank socket or interfere with the insertion or operation of the crank handle therein.

A further object of the invention is to provide a device of this type which is simple and economical to manufacture and easily and quickly installed.

A still further object is to provide such guard with a universal mounting means, so as to be attachable to all makes and styles of bumpers.

Still another object of the invention is to construct such device in a minimum number of simple metal stampings so as to avoid unnnecessary noise or rattling caused by the loosening or the wear of the parts.

These and other objects of the invention will become clear upon a reading of the attached specification and claims taken together with the accompanying drawing in which like parts are designated and referred to by like characters and wherein:

Figure 1:
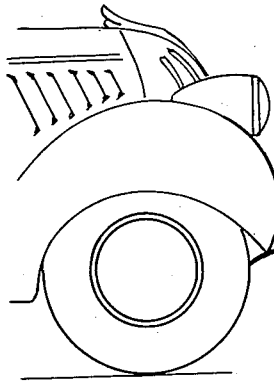
Figure 1 is a side view of the device mounted on the front bumper of an automobile.

This invention consists primarily of a bracket 11, the buffers 21 hinged to the bracket 11, and any one of the mounts or clamps 31, 31a or 31b.

The bracket 11 is made of sturdy metal; has a rectangular back section 12 which is drilled or stamped with a central hole to accommodate the bolt 13. The said bolt 13 projects rearwardly through the bracket 11, through one of the mounts 31 or 31a and then through the horizontal bumper bar 10 to which it is fastened and firmly held in place by the lock-washer 15 and the nut 14.

The bracket 11 also has two identical and parallel side sections 16, each of which extends forward of and integral with the back section 12 and at right angles thereto. The forward central portions of each of the side sections 16 have T shaped or somewhat triangular slots 17 in a horizontal line and are also drilled or stamped with holes 18 above and below the slots 17.

Each of the side sections 16 are substantially quadrilateral in outline with the vertical edges being parallel. The shorter of the two vertical edges on each of the side sections 16 is contiguous to the vertical side edges of the back section 12. The longer one of the two vertical edges or the forward edge, is the one opened for the aforementioned T shaped or triangular slot. The top and bottom edges of the quadrilateral outline are of the same length and join the vertical edges with the result that the interior angles or those nearer the short vertical edge are obtuse while the outer angles or forward top and bottom corners 19 are acute.

The inside top and bottom edges of the T shaped slot 17 at the apices indicated serve as stops as do the aforesaid acute corners, for the purpose of limiting or restricting the pivotal movement of the buffers 21. In the drawing the stops in the T shaped slot are indicated by the character 20 while the stops at the acute corners are designated by the character 19. The vertical or normal position of the buffers 21 is regulated by the stops 19 and the horizontal or temporary position of the buffers 21 is limited by the stops 20. Each of the buffers 21 swing within an arc of not more than 90°. They swing forward in a vertical line and toward, but independent of each other.

The buffers 21, also made of stamped durable sheet metal have front sections 22 and side sections 23, are provided with horizontally extending pins 24 which engage and move within the holes 18 of the bracket side sections 16. The forward inner adjacent corners 25 of the side sections 23 are rounded or arcuately curved so that the lower front corners of the top buffer member and the upper front corners of the bottom buffer member meet without clashing as the side sections 23 pivot on the pins 24.

The front sections 22 of the buffer members are rounded and follow the arcurate curve of the corner 25 and stop. The rounded portion of the front section 21 which is indicated in the drawing by the character 26, slides or moves within the T shaped slot heretofore mentioned. The pivotal movements of the buffers referred to, are dependent in part upon the distance between the edge of the portion 26 and the stops 20 and upon the relative positions of the back of the front section in the stops 19.

The buffers 21 fit around the brackets 11, that is, the buffer side sections 23 are on the outside of the bracket side sections 16 and conceal the T shaped slots and the pins 24. The ends only of the pins 24 are exposed to view.

In order to keep the buffer members 21 in their vertical or normal positions there is provided a coil extension or closed spring 27. The spring 27 is attached to the side sections 23 of the top and bottom buffers 21 and extends between the side section 16 of the bracket member a little to the rear of the horizontal pins 24. The spring 27 may be attached to the buffers 21 in any convenient manner. However, the simplest method of attachment is the one shown in the drawing. In the drawing there are illustrated two small horizontal pins 28 which extend between the side sections 23 and which pins engage the said spring 27. One end of the spring is attached to the pin 28 in the top buffer member and similarly the other end of the same spring is attached to the pin 28 in the bottom buffer member.

Figure 2:
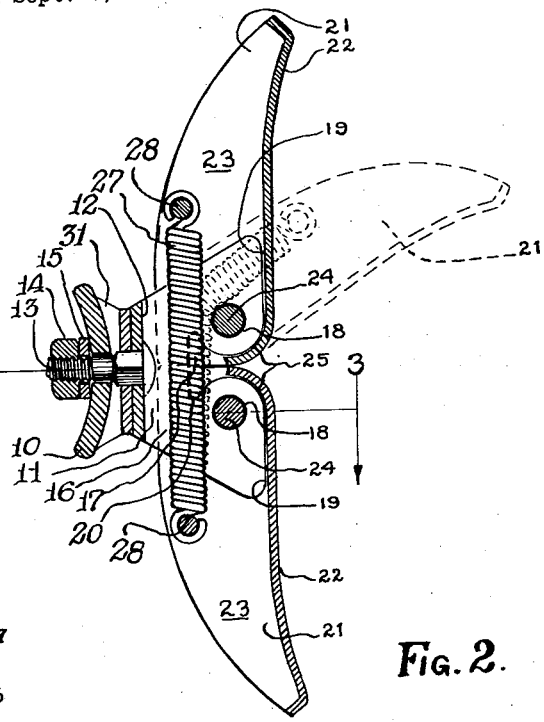
Figure 2 is an enlarged side view of the guard in section showing the interior assembly and construction.
Figure 4:
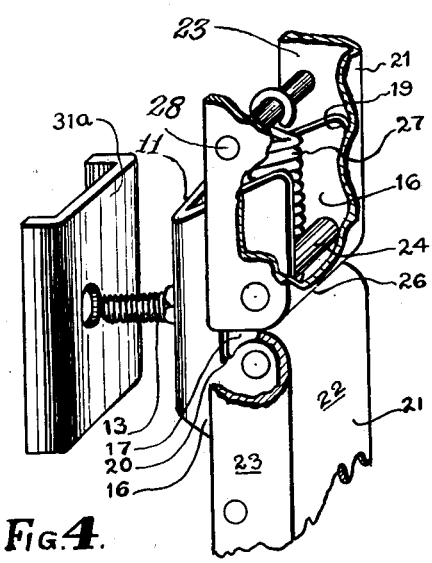
Figure 4 is a perspective view of the mid-section of the guard with parts broken away to show the interior structure. This view also shows a modified or straight bumper mount.
Figure 3:
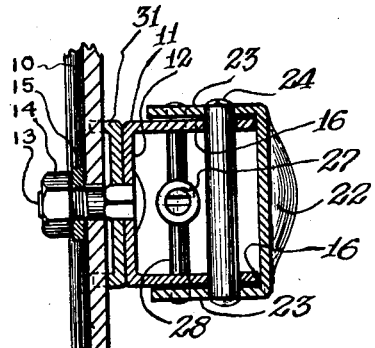
Figure 3 is a horizontal sectional view of the guard taken along the lines 3—3 of the Figure 2.

As heretofore mentioned the bracket 11 together with its attached buffer members is mounted on the bumper bars 10 of an automobile. To expedite such mounting and to accommodate different shapes of bumper bars there are provided the mounts 31 and 31a. The mount 31 is clearly shown in the Figure 2, wherein a curved bumper bar 10 is shown in vertical cross-section. The mount 31 is curved to fit the bumper. The mount 31a shown in the drawing of Figure 4 is similar to the mount 31 except, that the sides which contact the bumper bar 10 are straight in order to fit a correspondingly straight bumper bar 10.

Figure 5:
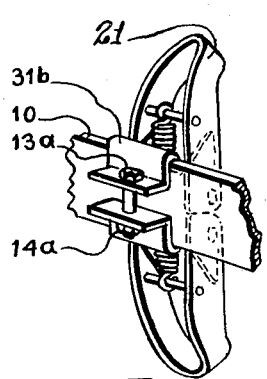
Figure 5 is a rear view of the guard embodying a modified form of bracket.
Figure 6:
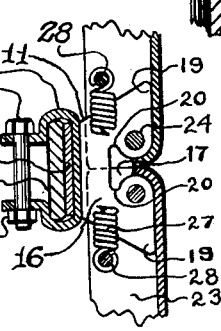
Figure 6 is an enlarged sectional view of a bracket similar to the one shown in the Figure 5, with parts broken away to show construction.

The Figures 5 and 6 show a modified type of mount 31b. This mount 31b is designed for bumper bars which are not drilled or which do not have holes at the points desired for the horizontal bolt 13. The mount 31b consists of a simple pinch-clamp which is held in place by the vertical extending bolt 13a and the nut 14a.

As conducive to a clearer understanding of this invention and its advantages over the earlier types of similar devices it may be well to point out that the prior art bumper guards are not hinged. Also, the horizontal bumper bars on the present day automotive vehicles are not all of the same height. Consequently the bumper bars and the guards attached to two or more automobiles often become entangled. That is, the vertical guard on one vehicle can and often does catch the horizontal bumper of another vehicle. It sometimes requires the actual removal of one of the bumpers or any one of the guards when such an accident happens. Now with the instant device, the body of the user's vehicles is protected because, the restricted movement of the buffer members will ward off blows in the direction of the body; but should the same bumper guard become entangled with the bumper of another vehicle, the permitted pivotal movement away from the body of the car will permit the second bumper bar to be withdrawn without trouble; and automatically and immediately the buffer members spring back into their normal positions ready to guard against other blows or accidents.

It will now be clear that there is provided by this invention a bumper guard which accomplishes the objects of the invention. While the invention has been described in its preferred form and while certain general terms and specific language have been used, it is to be understood that the embodiment of the invention as described is illustrative only and is not to be considered in a limiting sense. It is to be further understood that there are other forms of the invention which will suggest themselves to persons making, using or selling similar devices and those modifications as well as the modifications of the illustrated form are all considered to be within the broad scope of the invention as no limitations upon it are intended other than those imposed thereon by the scope of the appended claims.

I claim:

1. A bumper guard, comprising in combination, a bracket member, vertical stops on the said bracket member, horizontal stops on the said bracket member, buffer members hinged to the said bracket member, the movement of which is limited to the said vertical and horizontal stops, and a means for retaining the said buffer members normally in line and at the said vertical stops.

2. A bumper guard, comprising in combination, a bracket member, vertical stops on the said bracket member, horizontal stops on the said bracket member, a top buffer member hinged to the said bracket member, a bottom buffer member hinged to the said bracket member, the pivoted movement of the said buffer members being restricted by the said stops, and a means for normally retaining the said buffer members at the vertical stops.

3. A bumper guard, comprising in combination, a bracket member, having vertical and horizontal stops thereon, top and bottom buffer members hinged to the said bracket and movable within the said stops, a spring for automatically retaining the said buffer members at the vertical stops, and a means for attaching the bracket to the said bumper.

4. A bumper guard, comprising in combination, a bracket member having two parallel vertical side sections, each of the said side sections having a centrally disposed eccentric slot therein, a pair of vertical top and bottom oppositely disposed buffer members, the top buffer member being independently hinged above the eccentric slot and partly movable therein, the bottom buffer member being independently hinged below the eccentric slot and partly movable therein, a means within the bracket member and attached to both of the buffer members for normally retaining the said buffer members in a vertical position, and a clamp attached to the said bracket member for mounting the same on an automobile bumper.

JOHN J. RIEHL.